No. 841,170. PATENTED JAN. 15, 1907.
V. NACHT, P. SALOMON & J. ERZEN.
BASKET.
APPLICATION FILED AUG. 8, 1906.
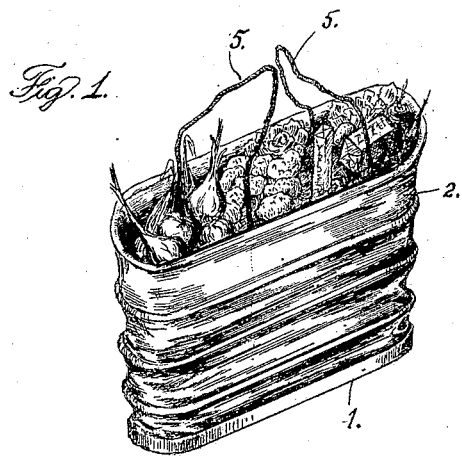
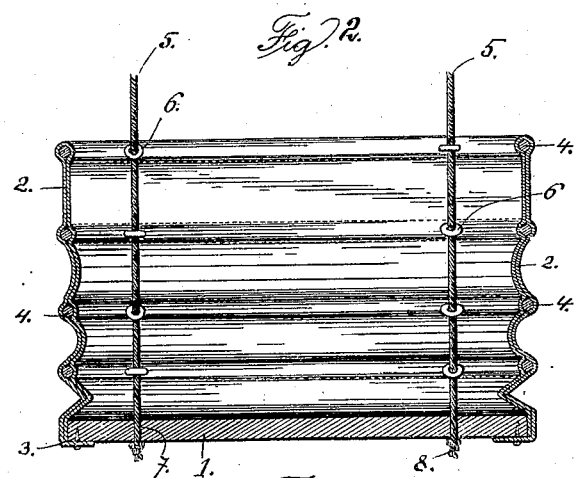
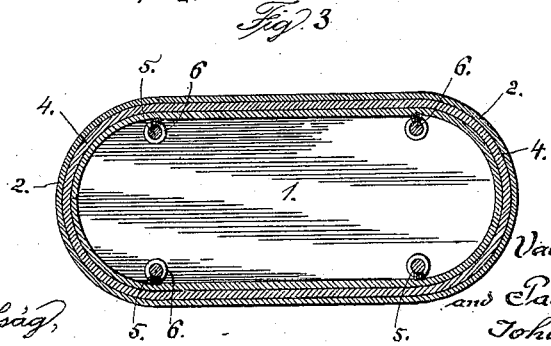

UNITED STATES PATENT OFFICE.

VALENTIN NACHT AND PAUL SALOMON, OF PITTSBURG, AND JOHAN ERZEN, OF FINLEYVILLE, PENNSYLVANIA.

BASKET.

No. 841,170.     Specification of Letters Patent.     Patented Jan. 15, 1907.

Application filed August 8, 1906. Serial No. 329,726.

*To all whom it may concern:*

Be it known that we, VALENTIN NACHT and PAUL SALOMON, of Pittsburg, county of Allegheny, and JOHAN ERZEN, of Finleyville, county of Washington, State of Pennsylvania, citizens of the United States of America, have invented certain new and useful Improvements in Baskets, of which the following is a specification, reference being had therein to the accompanying drawings.

This invention relates to certain new and useful improvements in baskets and like receptacles; and the invention has for its object to provide a simple and inexpensive folding basket.

Briefly described, our improved basket consists of a base and flexible side walls preferably constructed of canvas and strengthened by a plurality of ribs or rings. The bails or handles of the basket are made of rope or a similar flexible material having its ends fastened to the bottom of the basket and passing through eyelets secured to the inner sides of the walls of said basket. The basket is particularly adapted for market use and in a collapsed condition occupies a comparatively small space and is easily carried.

The novel manner in which the basket collapses permits of its being used to hold various quantities of merchandise, the quantity of merchandise carried by the basket depending upon the height of the side walls and the manner in which they are collapsed.

The detail construction of our improved basket will be hereinafter more fully described, illustrated, and then specifically pointed out in the claim, and, referring to the drawings accompanying this specification, like numerals of reference designate corresponding parts throughout the several views, in which—

Figure 1 is a perspective view of our improved basket as filled with merchandise. Fig. 2 is a longitudinal sectional view of the basket, and Fig. 3 is a horizontal sectional view.

To put our invention into practice, we construct our improved basket of a light and durable base-plate 1, which forms the bottom of the basket. The side walls of the basket are formed of a flexible material 2, such as canvas. The side walls are formed by doubling the flexible material and securing its edges to the bottom edges of the plate 1, as at 3. Between the two layers or plies of canvas are arranged a plurality of horizontally-disposed rings or ribs 4, which are preferably equally spaced apart.

The bails or handles of the basket are formed of two pieces of flexible material 5, such as rope, the handles passing through eyelets 6, secured to the inner sides of the walls opposite each ring or rib. The ends of the handles pass through openings 7, formed in the bottom plate 1, and are retained therein by knotting the rope from which the handles are made, as at 8, or may be suitably fastened to the bottom plate 1.

When the basket in not in use, the side walls are collapsed upon the bottom plate 1, the eyelets 6 sliding easily upon the rope from which the bails or handles are made.

When the basket is to be used, the merchandise or articles to be carried by the basket are placed upon the bottom plate 1, the side walls elevated the desired height to inclose the articles, and then the articles are packed, whereby they will maintain the side walls in a raised or elevated position. The manner in which the side walls are constructed permits of various quantities of merchandise being carried by the basket, the side walls being elevated their entire height, if necessary, as illustrated in Fig. 1, or may be partially elevated, as illustrated in Fig. 2.

The basket has been illustrated as being oval or oblong in contour; but it is obvious that the basket may be made of various shapes, according to the use for which it is intended.

We do not care to confine ourselves to the flexible material constituting the side walls of the basket or to the size or proportion of the basket, as such changes in the details of construction as are permissible by the appended claim may be resorted to without departing from the spirit and scope of the invention.

What we claim, and desire to secure by Letters Patent, is—

A basket comprising a base-plate forming a bottom, and a body formed of a single piece of material doubled to form two ply having its ends secured to the bottom, rings placed between the two ply of the body at intervals and held spaced apart, eyes carried by the inner ply of the body and handles in the form of flexible cords passed through said eyes with the ends secured to the bottom.

In testimony whereof we affix our signatures in the presence of two witnesses.

VALENTIN NACHT.
PAUL SALOMON.
JOHAN ERZEN.

Witnesses:
H. C. EVERT,
MAX H. SROLOVITZ.